INVENTOR.
PERRY W. ESTEN
BY Milford A. Juten

Dec. 17, 1968 P. W. ESTEN 3,417,402

COMBINING NETWORK FOR RADIO FREQUENCY POWER SOURCES

Filed Jan. 11, 1967 7 Sheets-Sheet 3

PER-CENT OF TOTAL COMBINED POWER DISSIPATED IN R1 OR R2 AS A FUNCTION OF THE RATIO OF THE POWER DELIVERED BY TRANSMITTER 1 AND 2 FOR RELATIVE TRANSMITTER PHASES OF 0°, 45°, 90°, 135°, AND 180°.

REAL PART OF INPUT IMPEDANCE AS A FUNCTION OF COMBINER HALF-LENGTH FOR VARIOUS VALUES OF CHARACTERISTIC IMPEDANCE

INPUT REACTANCE AS A FUNCTION OF COMBINER HALF-LENGTH FOR VARIOUS VALUES OF CHARACTERISTIC IMPEDANCE 3,417,402

COMBINING NETWORK FOR RADIO FREQUENCY POWER SOURCES

Perry W. Esten, Burlingame, Calif.
(1 English Garden, 8000 Munich 22, Germany)
Filed Jan. 11, 1967, Ser. No. 608,556
7 Claims. (Cl. 343—852)

ABSTRACT OF THE DISCLOSURE

The present invention provides a system or means of coupling two transmitters or other radio frequency power sources which may operate over a broad frequency range to feed into a common load thereby combining the power sources in a manner so that no malfunction or mis-adjustment or operating condition of either power source can adversely affect the other power source or the system.

*Specification*

Heretofore attempts have been made to combine the output of two radio transmitters to a single antenna using transmission line type elements but none has been entirely satisfactory because there was danger of damage to the transmitters because the prior art combining structures were designed for a single frequency and consequently were not suitable for use where the frequency to be broadcast would vary.

An object of the present invention is to provide a combining network which overcomes the difficulty and provides for combining the power of two transmitters to a single antenna without danger of damage of either transmitter in the event of malfunction of either transmitter.

Another object is to provide a combining network suitable for connecting two transmitters to transmit radio waves over a wide range of frequencies.

Other and further objects will be apparent as the description proceeds and upon reference to the accompanying drawings, wherein:

FIGURE 1 diagrammatically shows four parallel conductors with a transmitter connected to one end of opposite pairs of conductors and a second transmitter connected to opposite ends of a different pair of conductors with load resistances between diagonally opposite conductors corresponding to a dissipation resistor and to an antenna.

Figure 4:
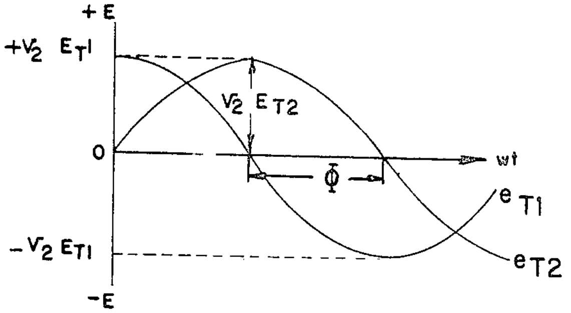

FIGURE 4 diagrammatically represents the instantaneous voltage at the combiner input with relative phase $\Phi$.

Figure 5A:
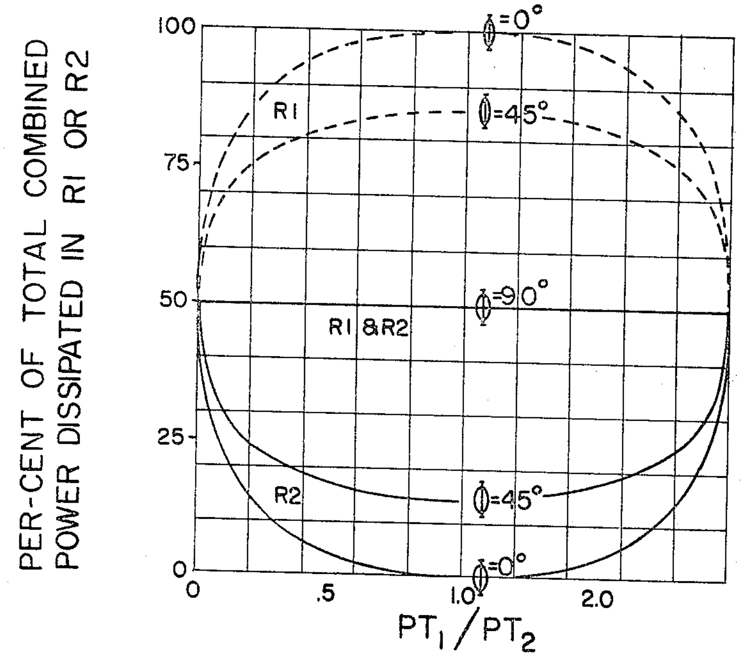
Figure 5B:
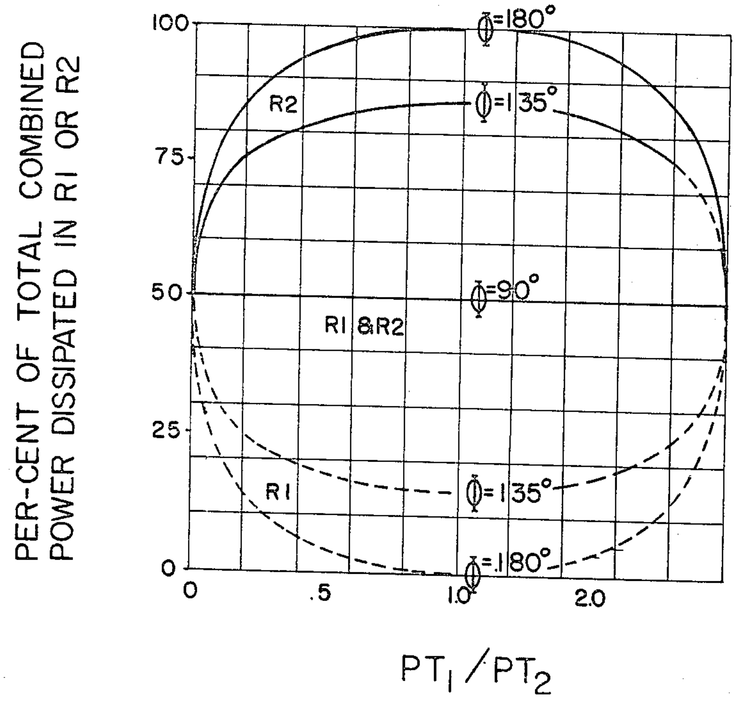

FIGURES 5A and 5B show the power dissipation for phase differences between transmitters 1 and 2.

Figure 6:
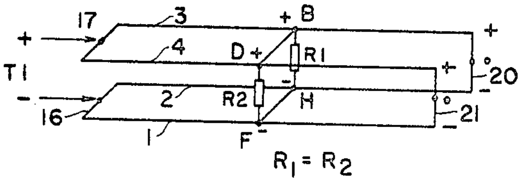

FIGURE 6 is a diagrammatic perspective of the combining network modified to illustrate the effect of only one transmitter operating.

Figure 7:
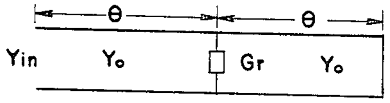

FIGURE 7 shows a simplified equivalent circuit as seen from either transmitter.

Figure 8:
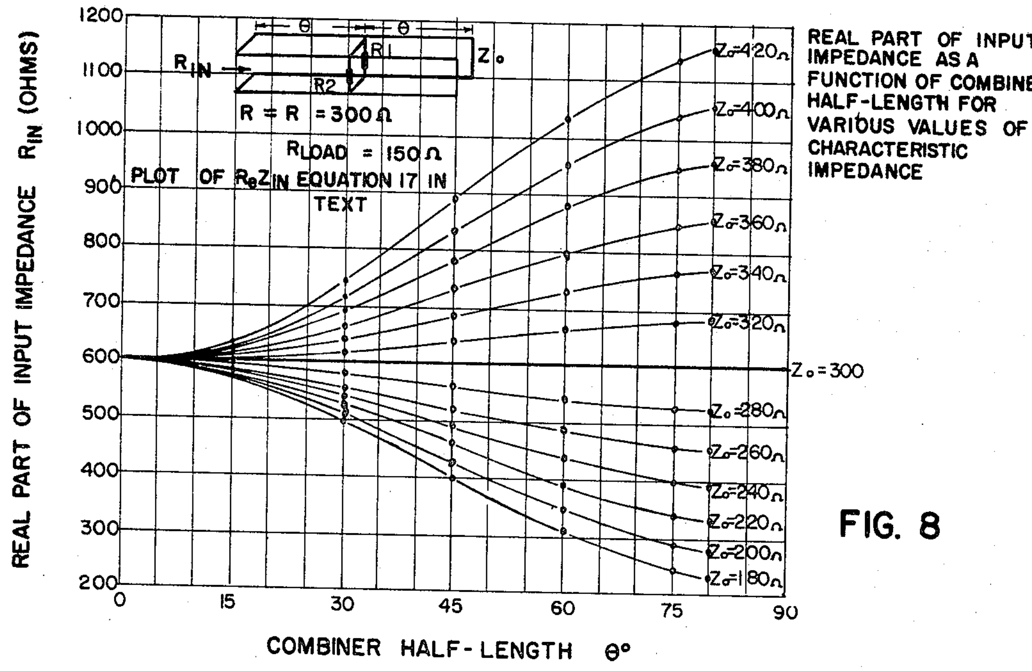
Figure 9:
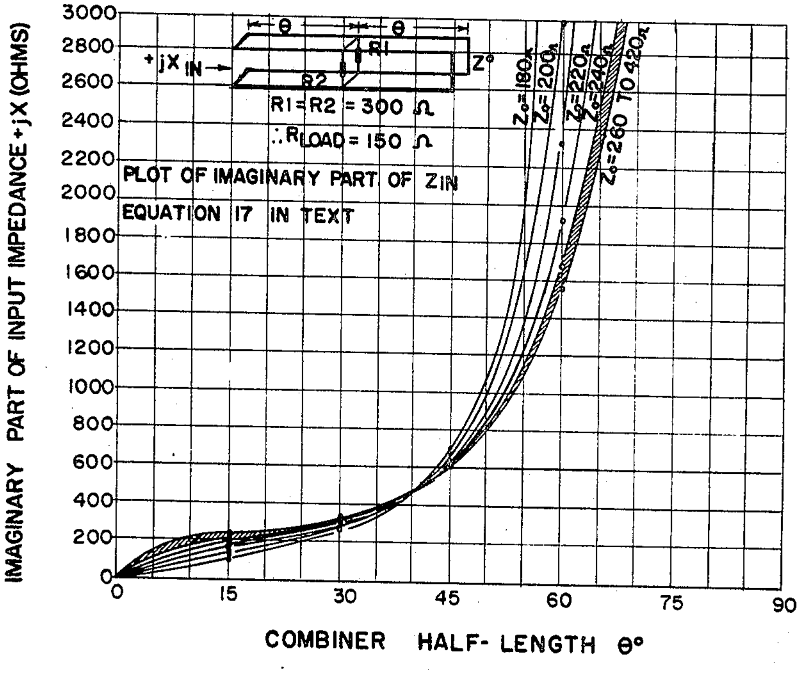

FIGURES 8 and 9 are graphical representations of impedance.

Figures 10, 11:
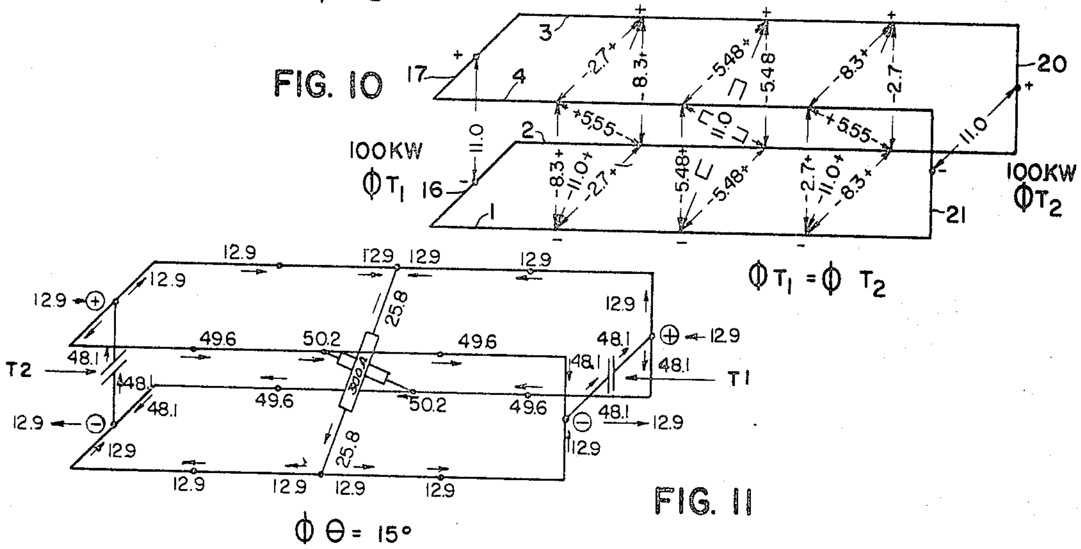

FIGURE 10 shows the computed peak voltage distribution in kilovolts across the elements of the combining network when it is fed by two in-phase 100 kilowatts transmitters each driving a 600 ohm resistive load.

FIGURE 11 illustrates the current distribution in amperes RMS under the same operating conditions.

Figure 12:
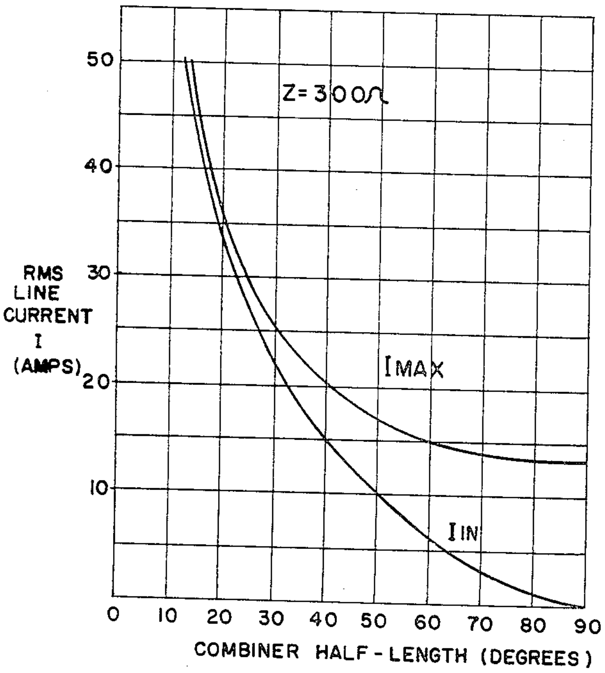

FIGURE 12 shows the maximum RMS current in the combiner network as a function of combiner half-length computed for a network with surge impedance 300 ohms and a power of two 100 kw. transmitters combined.

Figure 13:
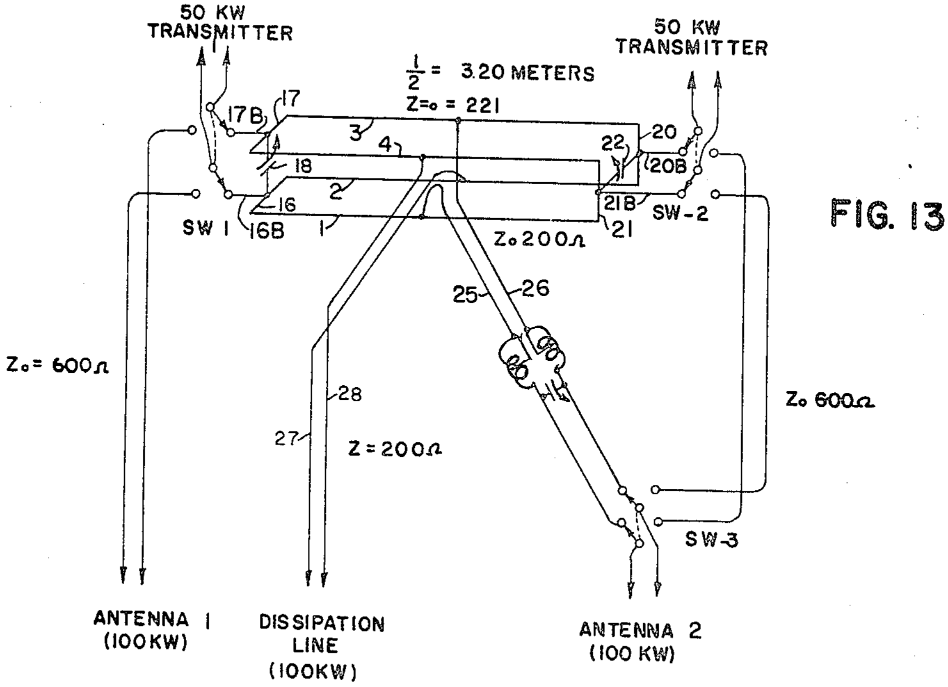

FIGURE 13 is a schematic view of the combining network as actually constructed so that the power of two 50 kw. transmitters may be supplied to different antennas or the transmitters may be connected to transmit the power to a single antenna through the combiner shown in perspective.

Figure 14:
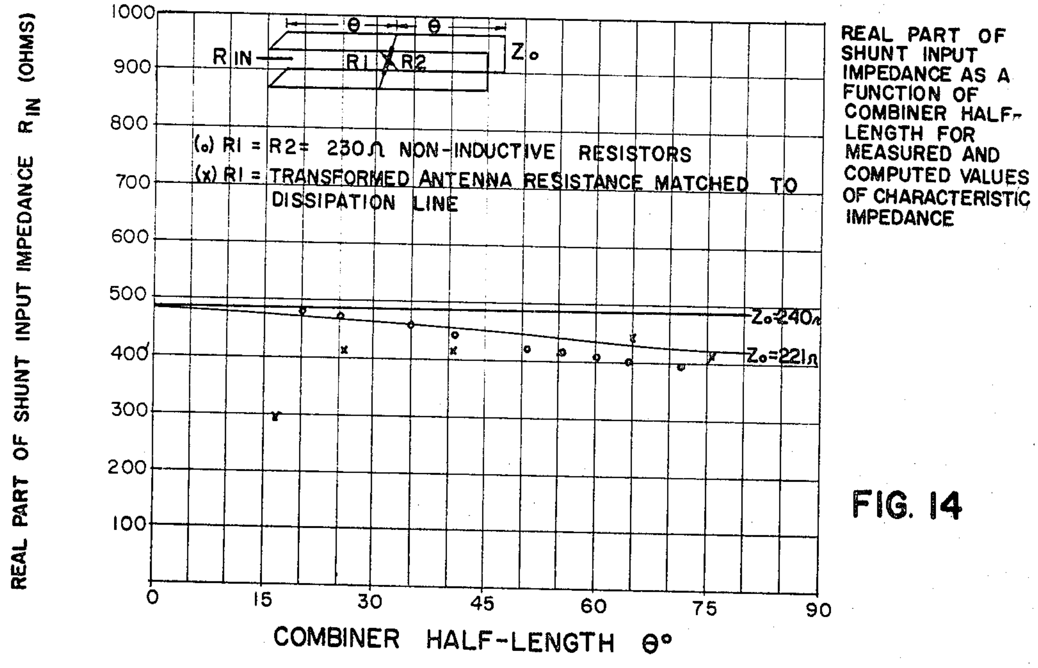
Figure 15:
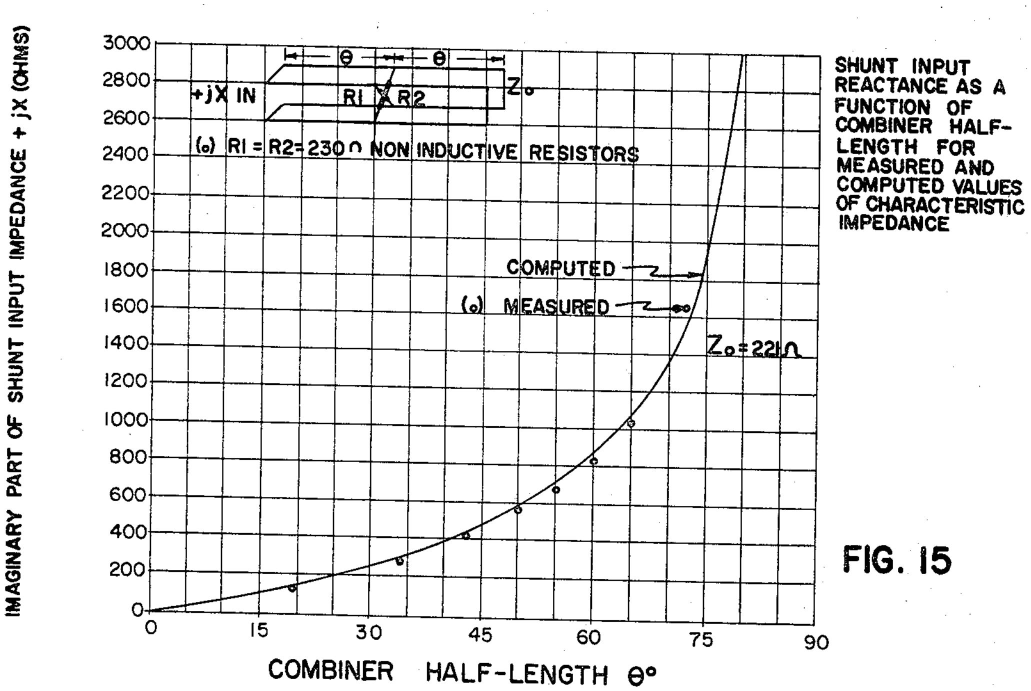

FIGURES 14 and 15 are graphs showing how the measured impedance parameters compare with those computed for the installed combining network.

Figure 16:
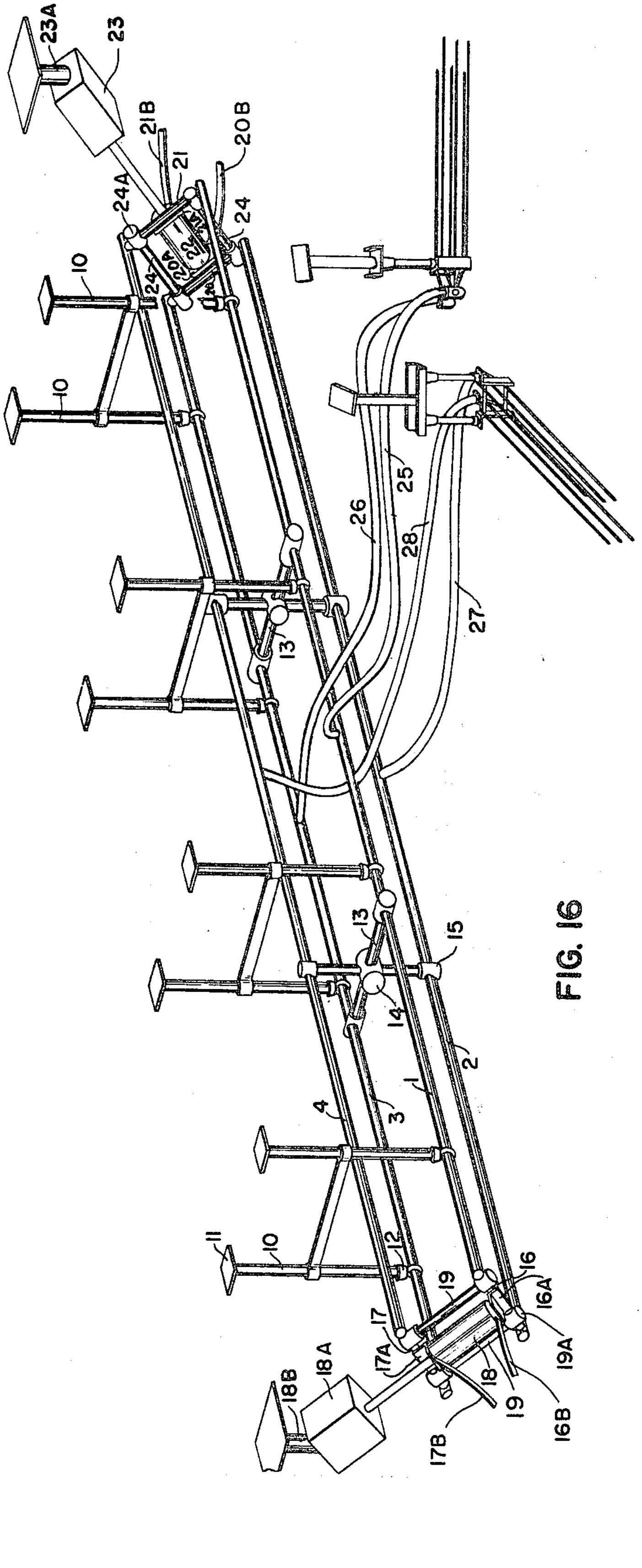

FIGURE 16 is a perspective of the combining network for attachment to a ceiling of a building and showing the variable capacitors for adapting the combiner for different frequencies of transmitters 1 and 2 and showing the leads to the transmission lines for the antenna and the dissipation resistor.

Figure 1:
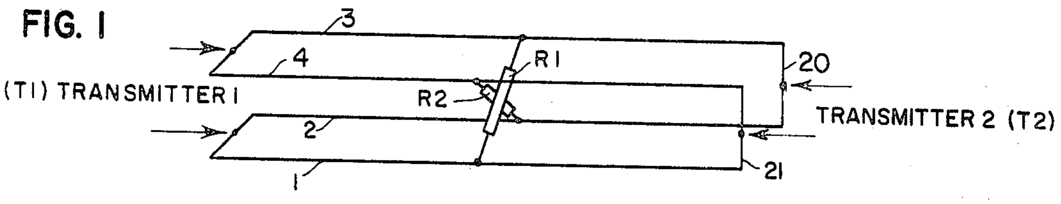
Figure 2A:
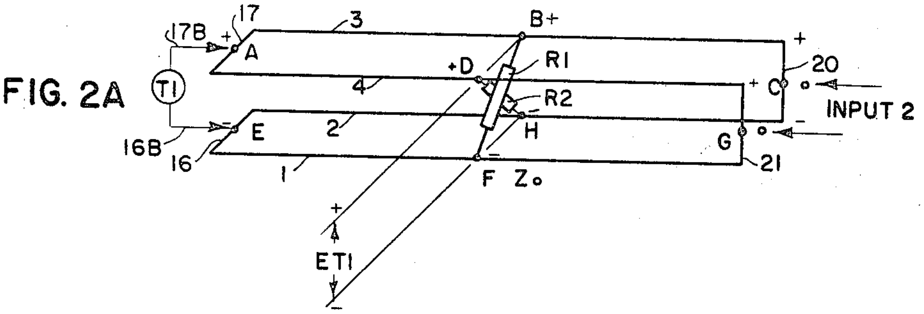
FIGURE 2A is a similar perspective view showing the polarity of the circuit when a single transmitter is applying power to the combiner.

Referring more particularly to FIGURES 1, 2A and 16, the combining network includes four substantially straight conductors 1, 2, 3, and 4 arranged in side-by-side relation at the edges of an imaginary elongated prism of square cross-section and supported from a ceiling bulkhead (not shown) by means of vertically disposed insulators 10 having an attaching flange 11 for securement to the ceiling and having an eye 12 through which conductors 1 and 3 pass, thereby maintaining conductors 1 and 3 in substantially parallel relation with the plane of such conductors being substantially parallel to the ceiling. Conductors 2 and 4 are supported from conductors 1 and 3 by means of insulators 13 arranged in a +-arrangmeent, with the conductors radiating from a central boss 14 and terminating in eye members 15 through which the four conductors pass.

A conductive connection 16 between the first ends of conductors 1 and 2 and a conductive connection 17 between the first ends of conductors 3 and 4 are connected respectively to dihedral angle bracket members 16A and 17A which are connected to a first variable reactance 18 shown as a variable capacitor operated by a motor 18A supported from the ceiling by a flanged post 18B whereby the variable capacitor can be adjusted at a remote control center. Insulators 19, 19 having eye members 19A at each end support the connections 16 and 17 thereby maintaining the first ends of the conductors 1, 2, 3, and 4 in accurate position from the ceiling.

A conductive connection 20 between the second ends of conductors 2 and 3 and a connection 21 between the second ends of conductors 1 and 4 are connected respectively to dihedral angle members 20A and 21A which dihedral angle brackets are connected to the terminals of a variable reactance 22 which is operated by a motor 23 supported from the ceiling by a bracket post 23A, whereby the reactance 22 shown as a capacitor can be adjusted from a remote control point. Insulators 24, 24 having eye members 24A at each end maintain the conductive connections 20 and 21 in spaced relation and effectively support the variable capacitance.

Leads 16B and 17B connected to connections 16 and 17, respectively, extend to the power supplied from transmitter T1 and leads 21B and 20B from connections 21 and 20 at the second ends of the conductors extend to the power from the second transmitter T2. Suitable switches SW–1 and SW–2 of the double pole double throw type provide for switching the power from transmitter T1 and transmitter T2 to the combining network of the present invention or to separate antennas, as clearly shown in FIGURE 13.

Figures 2B, 3:
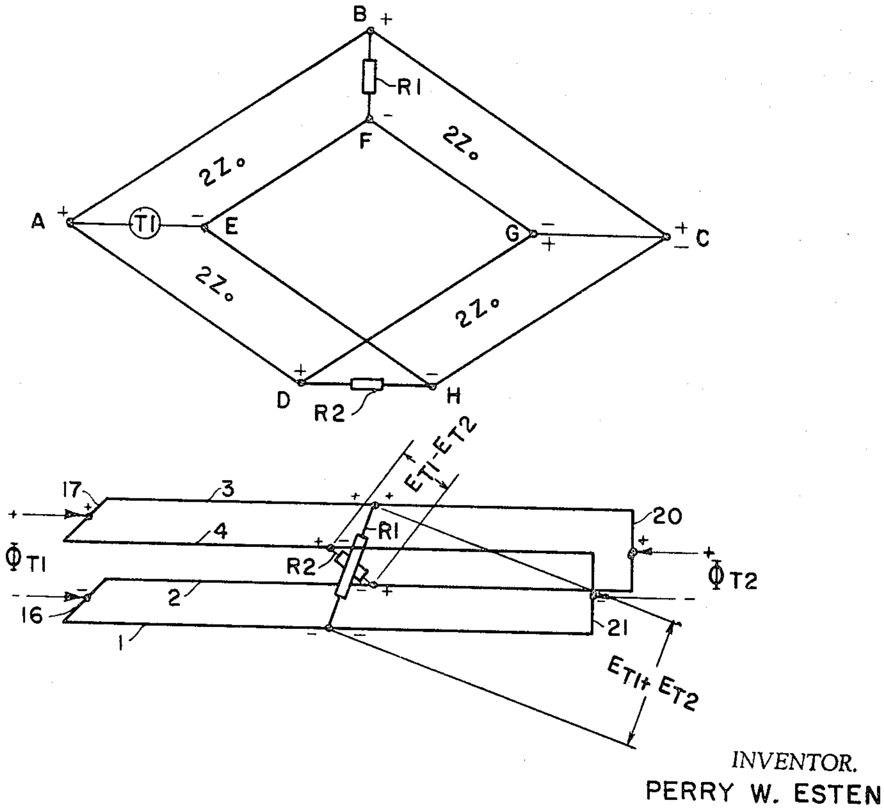
FIGURE 2B is a two dimensional illustration of FIGURE 2A.
FIGURE 3 shows the phase relationship between the two transmitters and their instantaneous polarities.

A first power receiving load, shown as a resistor R1 in FIGURES 1, 2A and 3 and shown as an antenna 2 in FIGURE 13, is connected by leads 25, 26 to the midpoints of conductors 1 and 3 which are connected to suitable inductance and capacitance through a double pole double throw switch SW–3 to the antenna 2. A second power receiving load, shown as resistance R2 in FIGURES 1, 2A and 3 and as a dissipation line in FIGURE 13, is connected by leads 27 and 28 to the midpoints of conductors 2 and 4, respectively. It will be apparent that suitable transmission lines shown as 6-wire lines suitably supported by insulation provide for the transmission of power to the antenna and to the dissipation resistor.

The combining network provides for power to be furnished to either or both of the load resistors depending upon the relative power and phase of the transmitters. When the two transmitters are operated in-phase and with equal power, the sum of the two transmitter powers is delivered to one of the load resistors. When the two transmitters are operated 180° out of phase, the sum of the two transmitter powers is delivered to the other load resistor. When only one transmitter is operating, the power is divided equally between the two load resistors. In practice, one of the load resistors is an antenna and the other is a dummy load used to absorb power when the combining network is not properly phased, when the power outputs from the transmitters are unequal, or when one of the transmitters has failed. And finally, the combining system features frequency independent isolation between the input terminals by virtue of system balance.

The configuration in FIGURE 1 may be redrawn as shown in FIGURES 2A and 2B. The three-dimensional arrangement shown in FIGURE 2A has a characteristic impedance $Z_o$ for a four-wire side connected line. It may be reduced to the two-dimensional configuration shown in FIGURE 2B because the diagonal pair of lines are decoupled from each other by virtue of each pair being in the neutral plane of the other pair. It can be shown that the surge impedance of the two diagonal wires is twice the characteristic impedance of the four-wire configuration. Therefore, the resistors BF and DH are load resistors at the center of two-wire lines whose impedance is $2Z_o$. If instantaneous polarities are assigned to transmitter T1 for example, the voltage at G and C will be zero because of the 180° line transposition at DH. A voltage applied at either input will appear at the opposite input terminal as two voltages 180° out of phase. A "virtual short circuit" is then seen across the opposite input by each transmitter, and input to input isolation is given. Both circuits in FIGURES 2A and 2B lend themselves to analysis; the system may be treated as comprising two decoupled lines of impedance $2Z_o$ as in FIG. 2B, or as one four-wire side-connected line of impedance $Z_o$, as in FIG. 2A. A more concise analysis may be made using the four-wire approach. When the combiner is considered as being terminated by two short-circuited side connected stubs in parallel (BCH and DGF), and the combination shunted by the load resistors as in FIGURE 2A, and if the circuit is truly balanced, no voltage will appear across the short circuit of the stubs and the terminals G and C may be either grounded, shorted or open without affecting conditions at the opposite input. This is the feature which provides frequency independent isolation between the input terminals. It results in isolations that are dependent only upon the degree of symmetry of design and fabrication and upon coupling external to the circuit.

The combining network shown in FIGURE 2A shows the instantaneous voltages and their polarities due to one transmitter. If loads $R_1$ and $R_2$ in FIGURES 2A and 2B are equal, transmitter 1 (T1) will produce a voltage $E_{T1}$ across the combined load DH and FB. The power delivered to the loads will then be:

$$P_{T1}=\frac{E_{T1}^2}{R_t} \quad (1)$$

where $$R_t=\frac{R_1}{2}=\frac{R_2}{2}$$

Combining and rearranging terms, an expression that gives the power division between the two load resistors is:

$$P_{T1}=\frac{\dot{E}_{T1}^2}{R_1}+\frac{\ddot{E}_{T1}^2}{R_2} \quad (2)$$

where $$E_{T1}=\dot{E}_{T1}=\ddot{E}_{T1}$$

and $\dot{E}_{T1}$ is the voltage across $R_1$ due to T1, and $\ddot{E}_{T1}$ is the voltage across $R_2$ due to T1.

Equation 2 states that with one transmitter operating, one-half of the total power delivered by the transmitter is furnished each of the equal load resistors. The first term gives the power absorbed by $R_1$, and the second term gives the power absorbed by $R_2$.

With two transmitters operating in-phase ($\Phi_{T1}=\Phi_{T2}$) and feeding power to each combiner input as shown in FIGURE 3, the voltage appearing across $R_1$ is $(\dot{E}_{T1}+\dot{E}_{T2})$; and the voltage appearing across $R_2$ is $(\ddot{E}_{T1}-\ddot{E}_{T2})$. In the case where the two transmitters are feeding equal power into the combining network, $E_{T1}=E_{T2}$, the voltage across $R_2$ becomes zero, and the power delivered to $R_1$ is the sum of the two transmitter powers, or:

$$P_{T1}+P_{T2}=\frac{(\dot{E}_{T1}+\dot{E}_{T2})^2}{R_1}+\frac{(\ddot{E}_{T1}-\ddot{E}_{T2})^2}{R_2}=\frac{4E_{T12}^2}{R_1} \quad (3)$$

Conversely, with the two transmitters operating 180° out of phase and feeding power to each combiner input, the voltage appearing across $R_2$ is $(\ddot{E}_{T1}+\ddot{E}_{T2})$; and the voltage appearing across $R_1$ is $(\dot{E}_{T1}-\dot{E}_{T2})$. When $E_{T1}=E_{T2}$, the voltage across $R_1$ becomes zero and the power delivered to $R_2$ is the sum of the two equal transmitter powers:

$$P_{T1}+P_{T2}=\frac{(\ddot{E}_{T1}+\ddot{E}_{T2})^2}{R_2}+\frac{(\dot{E}_{T1}-\dot{E}_{T2})^2}{R_1}=\frac{4E_{T12}^2}{R_2} \quad (4)$$

If $E_{T1}\neq E_{T2}$, then all of the power is not delivered to $R_2$, but it is divided between $R_1$ and $R_2$. This means that the transmitters are not delivering equal power to the combiner inputs and (3) and (4) above also show the power division to the loads. Each term represents the power absorbed by the associated resistor. This applies when the transmitters are operated at arbitrary power levels, and postulates that:

$$E_{T1}\geq E_{T2}$$
$$\Phi_{T1}=\Phi_{T2}$$
$$R_1=R_2$$

When the transmitters are operated at phase relationships between 0° and 180°, then, as with differing power levels, all of the power is not delivered to either one of the load resistors, but it is divided between the two resistors. It is desired to derive an expression that gives the power distribution between the two load resistors as a function of the relative phase between the two transmitters and for any relative input power, the instantaneous transmitter powers $p_{T1}$ and $p_{T2}$ must be integrated over one period; considering, two sinusoidal voltages, one from transmitter T1 and the other from transmitter T2 separated in phase by an angle $\Phi$ as shown in FIGURE 4. The maximum amplitude of the voltages is $\sqrt{2}E_{T1}$ or $\sqrt{2}E_{T2}$, where $E_{T1}$ or $E_{T2}$ is its effective value.

The instantaneous power $p$ from each transmitter $p_{T1}$ and $p_{T2}$, and the instantaneous power distribution to the load resistor is:

$$p_{T1}+p_{T2}=\frac{[\sqrt{2}\ddot{E}_{T1}\cos(\omega t)+\sqrt{2}\ddot{E}_{T2}\cos(\omega t-\Phi)]^2}{R_1}+\frac{[\sqrt{2}\ddot{E}_{T1}\cos(\omega t)-\sqrt{2}\ddot{E}_{T2}\cos(\omega t-\Phi)]}{R_2} \quad (6)$$

the useful power is then the sum of all $p$ during one period:

$$P_{T1}+P_{T2}=\frac{1}{2\pi}\int_0^{2\pi} p_{R1}\,d\omega t+\frac{1}{2\pi}\int_0^{2\pi} p_{R1}d\omega t \quad (7)$$

Substituting (6) and (7) and integrating, the following expression is obtained.

$$P_{T1}+P_{T2}=\frac{\ddot{E}_{T1}^2+2\ddot{E}_{T1}\ddot{E}_{T2}\cos\Phi+\ddot{E}_{T2}^2}{R_1}+\frac{\ddot{E}_T^2-2\ddot{E}_{T1}\ddot{E}_{T2}\cos\Phi+\ddot{E}_{T2}^2}{R_2} \quad (8)$$

where $E_{T1} \geqq E_{T2}$.

It is interesting to examine Equation 8 for phases of 0°, 90° and 180°. When the relative phase between T1 and T2 is zero, (8) reduces to (3), which is to be expected. At a 90° relative phase between transmitters, (8) reduces to:

$$P_{T1}+P_{T2}=\frac{\ddot{E}_{T1}+\ddot{E}_{T2}}{R_1}+\frac{\ddot{E}_{T1}+\ddot{E}_{T2}}{R_2} \quad (9)$$

which states that the total power from both transmitters is equally dissipated by both resistors when $P_{T1}=P_{T2}$. If the relative phase between transmitters is 180°, (8) reduces to (4). If $P_{T2}$ becomes zero, (i.e. only one transmitter operating) then Equation 8 reduces to 2. Equation 8 is then a general expression showing how the power is divided between the two load resistors depending upon the magnitude of the two transmitter powers and the relative phase between them.

The foregoing discussion shows that the power dissipated by $R_1$ and $R_2$ is dependent upon the input power of both transmitters and the relative phase of the voltage between them. Without writing additional relations for $E_{T1}$ and $E_{T2}$, the expression in (8) cannot be evaluated since these voltages appear across the respective resistor only in the dynamic situation; i.e., with both transmitters operating. But it is desirable to know how the total transmitter power is divided between the two load resistors with changes in transmitter power and relative phase. A simple method of analysis to determine the power division characteristics of such a network is by application of the principle of superposition. If the voltage and current at the load resistors are evaluated for one transmitter delivering a known power to the input of the network, and the method of superposition applied for two transmitters operating at different power levels and various relative phase relationships, the result will be the arrangement shown in FIGURE 5. This figure shows the percent of the total combined power that is dissipated in either resistor with various input power ratios and relative transmitter phase. It demonstrates that the combined output power is relatively insensitive to departures from the equal power criteria mentioned previously, but more sensitive to changes in the relative phase between transmitters.

It has been shown that the equivalent circuit of the combining network when energized with one transmitter is as shown in FIGURE 6. It has also been shown that because the isolation between transmitters is preserved, analysis of the impedance characteristics of the network may be simplified to an analysis of this equivalent circuit. The development of the circuit is from FIGURE 2A where points D and B, and F and H are at equal potential when one transmitter is operating.

The configuration of FIGURE 6 is a shorted four-wire stub with two parallel loads connected in the center. It may be viewed as two load resistors shunted with a four-wire side connected stub and fed by a four-wire side connected transmission line having a uniform characteristic impedance $Z_o$. The transmission line segment and the stub segment are of equal length.

The four-wire combiner configuration of FIGURE 6 reduces to the simple arrangement of FIGURE 7 if the four-wire transmission line is replaced by an equivalent two-wire line of equal characteristic admittance, and the load resistors are replaced with their parallel equivalent. It is useful to compute the input admittance for the configuration of FIGURE 7. A lossless, uniform transmission line is assumed whose characteristic admittance $Y_o$ is $\sqrt{C/L}$, whose length is $\theta$ in degrees, and whose load conductance is $G_r$ shunted by a shorted stub $\theta$ degrees long. The input admittance is:

$$Y_{in}=G_{in}+jB_{in} \quad (10)$$

The total load admittance, fed by a length of transmission-line $\theta$ degrees long is:

$$Y_r=G_r-j\frac{Y_o}{\tan\theta} \text{ where } \theta \lesseqgtr 90° \quad (11)$$

Applying the conventional transmission-line equations, the normalized input admittance becomes:

$$Y=\frac{Y_{in}}{Y_o}=\frac{Y_r+jY_o\tan\theta}{Y_o+jY_r\tan\theta} \quad (12)$$

Substituting (11) in (12) and taking the complex conjugate, (12) reduces to the following expression for the input admittance:

$$Y=\frac{Y_{in}}{Y_o}=\frac{G_rY_o\sec^2\theta}{4Y_o^2+G_r^2\tan^2\theta}-j\frac{2Y_o^2+(G_r^2-2Y_o^2)\tan^2\theta}{(4Y_o^2+G_r^2\tan^2\theta)\tan\theta} \quad (13)$$

It is enlightening to speculate what value $G_r$ should have relative to $Y_o$ for several values of $\theta$ to yield the most constant conductive term in expression (13). Examination of the first term for the input conductance reveals that when $$G_r=2Y_o \quad (14)$$

(13) becomes:

$$Y=\frac{1}{2}-j\frac{1}{2\tan\theta} \quad (15)$$

or $$Y_{in}=\frac{Y_o}{2}-j\frac{Y_o}{2\tan\theta} \quad (16)$$

Equation 16 is significant. This expression states that the input conductance is independent of the line length when $G_r$ is twice the value of the characteristic admittance. This means that in a combining network dimensioned according to (14), the input conductance is simply $Y_o/2$ for all frequencies. The susceptance term of course, varies with frequency—but in a rather simple manner.

A capacitive susceptance across the input to the network to correct for the inductive susceptance shown in (16) would suffice to offer a purely conductive load to the transmitter for network half-lengths less than 90 degrees; or stated another way, a variable capacitor installed at the combiner input would be adequate for adjustment at all frequencies for which the network half-length is less than a quarter wave-length long.

It may be of interest to convert (13) to its equivalent shunt impedance where R is the load resistance, $Z_o$ is the characteristic impedance of the line and $Z_{in}$ in its input impedance. Since $R=1/G$; $Z_o=1Y_o$; and $jX=v/jB$, $$Z_{shunt}=\frac{1}{G}-j\frac{1}{B}$$

$$z=\frac{Z_{in}}{Z_o}=\frac{4R^2+Z_o^2\tan^2\theta}{RZ_o\sec^2\theta}+j\frac{4R^2+Z_o^2\tan^2\theta}{\frac{2R^2}{\tan\theta}+(Z_o^2-2R^2)\tan\theta} \quad (17)$$

If $2R=Z_o$, then the normalized shunt input impedance is:

$$z_{in}=2+j2\tan\theta \quad (18)$$

or since $Z_{in}=Z_oz$, $$Z_{in}=2Z_o+j2Z_o\tan\theta \quad (19)$$

which is significant. Equation 19 states that the transformation of the resistive component of impedance is a constant, is frequency independent and equal to $2Z_o$ when the load resistance is $Z_o/2$. The equivalent shunt inductive reactance of course must be corrected by a shunt capacitive reactance equal to $2Z_o \tan\theta$.

The analysis is useful in that it provides information from which optimum design parameters may be obtained. It is desirable that the input resistance remain as constant as possible so that loading of the transmitter remains constant over the operating frequency range. This condition is realized in the case where $2R=Z_o$ so that $R_{in}=2Z_o$ for all frequencies. The shunt inductive reactance remaining at the combiner input may be corrected by one tuning control driving a shunt capacitor. When the frequency is low, the reactive term is small and therefore a very large capacitor is required. Conversely, when the frequency is high, the reactive term is large and a very small capacitor is required. Here, one of the limitations becomes apparent. A practical low frequency limit for such a combining network is reached when the size of shunt capacitor required becomes unrealistic or the magnitude of the reactive currents becomes too large.

The length of the combining network is not limited to half-lengths of less than 90 degrees for which the computations above apply, but provided the four-wire line remains uniform, it may be made longer. When the combiner half-length is greater than 90 degrees, the equivalent shunt input reactance becomes capacitive and a shunt inductor is required at the input; but the input resistance remains the same.

Since the reactive part of the equivalent shunt impedance must be corrected by lumped components (L or C), it is the practical size of these components, the magnitude of circulating currents, the degree of symmetry realizable in practice, and the amount of coupling external to the circuit that limit the range of frequencies over which the device will operate. Practical operation therefore, cannot be realized near combiner *half-lengths* of 0°, and multiples of 180°. For these discrete values of $\theta$, Equations 13 and 17 become indeterminate.

For a practical design it is useful to know how small variations in this optimum impedance design criteria affect the input impedance. FIGURE 8 is a plot of the real part of the equivalent shunt input impedance as a function of the combiner half-length for various values of $Z_o$ and a 150 ohm load. FIGURE 9 is a plot of the reactive part of the equivalent shunt impedance as a function of combiner half-length for various values of $Z_o$ and a 150 ohm load. FIGURES 8 and 9 are graphical representations of Equation 17.

Particularly attractive is the small variation in input resistance when the optimum-design criteria is not realized. It can be seen that practical values of input impedance are realized and that the range of shunt input resistance is quite tolerable for most transmitters with balanced outputs.

The effective transformation ratio of the real part of the shunt input impedance to the load resistor taking power is 2:1 when optimum-design criteria are used. In reality, since the load resistors are equal and in parallel, this transformation ratio is 4:1. In practice it may be difficult to realize four-wire transmission-lines of uniform characteristic impedance and terminated precisely by two resistors, each equal to $Z_o$. It is easy to compute a uniform line, but when it is installed in a practical situation (the inside of a transmitter building, for example), environment and coupling external to the circuit may become significant, and design parameters may only be approximated.

The foregoing analysis postulates two equal load resistors. When the combining system is properly adjusted, only one resistor contributes to the value of the shunt input impedance. If the value of the load resistor is changed during operation, another shunt input resistance will be reflected to both transmitters in accordance with the conditions shown in FIGURE 8. The reactive part of the impedance will not be greatly affected since FIGURE 9 implies that the shunt input reactance is almost constant for a wide range of matched load resistances. If the relative phase relationship between transmitters is not exactly 0° or 180°, or if there is some external coupling in the circuit which causes the flow of unbalanced currents, power will be dissipated in the alternate resistor. If both resistors are not then matched, an additional contribution to system unbalance will occur which is proportional to the degree of mismatch. If either resistor is unbalanced relative to the mutual ground between transmitters, unbalanced currents will result in the combining network. The flow of unbalanced currents in the circuit not only results in undesired power dissipation, but may also seriously affect input to input isolation.

It has been shown that frequency independent isolation exists between the combiner input terminals. FIGURE 6 gives the equivalent circuit for the combining network for each transmitter whether one or two transmitters are operating. In the special case where the combining system is properly adjusted so that all of the power from both transmitters is being dissipated by one resistor and the voltage drop across the other resistor is zero, the resistor dissipating no power is redundant to the circuit and could be removed. It can no longer contribute to the impedance characteristics of the network. In this special case, which is also the useful case, the equivalent circuit shown in FIGURE 2B becomes an attractive tool for rationalization of the paradox.

Consider the circuit in FIGURE 2B with two transmitters operating into an optimum-design network. The apparent resistance of the loads when viewed from either side will not be 300 ohms, but will be some other value depending upon the magnitude and phase of the voltage applied at the opposite input terminal. When the combiner is considered to be composed of two decoupled lines of surge impedance $2Z_o$, the apparent value of these resistors is transformed on this line to both inputs. At the inputs, the two shunt impedances are in parallel and their net impedance will equal $2Z_o+jX$. In the special case where the transmitter powers are equal and operation is in-phase, all the power will be dissipated in one resistor. The apparent value of this resistor becomes equal to $2Z_o$ which is transformed on a line of characteristic impedance $2Z_o$ to both inputs. That diagonal line is then matched and flat. Since there is no potential difference across the other diagonal line at the redundant resistor, the line appears from each transmitter as if it were virtually short circuited at the resistor. The shunt reactance is reflected from this short to each transmitter input on a line of surge impedance $2Z_o$. Thus, each transmitter sees a shunt load composed of the parallel combination of a resistor equal to $2Z_o$ and a reactance equal to $2Z_o \tan\theta$. This would be expected from (19).

For high power applications, networks must be dimensioned within corona limitations. It is useful therefore to know the voltage variation along the length of such a system. Since corona is not a function directly of peak voltage but is also related to effective voltage and waveform, it appers reasonable to use an unmodulated power of 100 kw. to represent 50 kw., 100% modulated. Therefore, assume that two 100 kw. transmitters are feeding power into the inputs of an optimum-design combining network, and that the linear system is lossless; the equivalent shunt input resistance is 600 ohms; both transmitters are operating in-phase, and the combined power is being fed to one 300 ohm resistor. If the peak voltage at five points along the combiner length is computed for one transmitter, and the principle of superposition applied for both transmitters for combiner half-lengths of 15°, 30°, and 45°, the result is the voltage arrangement shown in FIGURE 10.

The voltages vary slightly with combiner half-length so that average values are shown. In general, the impedance transformation is toward lower values which implies lower peak voltages within the system. When two transmitters are operating in-phase and with equal power, the maximum voltage in the network occurs on the diagonal line feeding the load resistor. For combiner half-lengths less than 90°, this voltage is not greater than the voltage across the input for any phase relationship and transmitter power ratio. In general, the magnitude of the peak voltages shown in FIGURE 10 are quite tolerable for these power levels and may be easily reduced to practical component dimensions within corona limitations.

If the current in series with the line is computed for five points along the length of the combining network with one 100 kw. transmitter operating, and the principle of superposition applied for two transmitters for a network half-length of 15°, the current distribution shown in FIGURE 11 results.

The magnitude of circulating currents within the combiner network are quite tolerable for these power levels. They are given in amperes, RMS. For combiner half-lengths greater than 15°, the magnitude of these currents decreases. For combiner half-lengths less than 15°, the magnitude of the reactive circulating currents increases rapidly and becomes indeterminate near half-lengths of 0°. The current limiting segments within the network are those connected to the dummy load resistor, and for half lengths near and shorter than 15°, the current varies only slightly along their lengths.

When two transmitters are operating in-phase and with equal power, the maximum current occurs at the load resistors, on the diagonal line supporting the dummy load. The current at this point has been computed for a range of combiner half-lengths, and compared with the current at the input to this line. FIGURE 12 shows the results of these computations. They are based upon an optimum-design network with $Z_0=300\Omega$, load resistance of 300Ω and two 100 kw. transmitters operating in-phase.

It can be seen that the circulating currents increase rapidly for combiner half-lengths less than 15°. When the combiner is short, the line current approaches the maximum current in magnitude.

FIGURES 13 and 16 show the combiner together with switches, input capacitors and transformation network. All three switches are remotely controlled from the front panel of one of the transmitters and all tuning adjustments are accomplished remotely. The combiner input capacitors and components in the transformation network are preset to a calibrated setting in the band center. No other adjustments are required for operation within the band. Remote instrumentation allows the current in the dissipation-line and the current in the output line of the combiner to be monitored.

Manufacturer's data supplied with the transmitters showed that a 300 to 500 ohm shunt load resistance would be preferable to a 600 ohm load. The final combining system was therefore constructed using 30 mm. diameter copper tubing spaced 400 mm. apart in the four-wire side connected configuration for a computed surge impedance of 217 ohms. It was difficult to predict the real value of the combiner surge impedance when installed in the transmitter building. For this reason, optimum-design criteria was not realized. It has been pointed out that the system is not sensitive to parameter changes so long as wide excursions from optimum values are not made. The final load resistors were dimensioned for 200 ohms, and the final measured combiner surge impedance was about 221 ohms. This meant that the equivalent shunt input resistance would vary between 410 and about 480 ohms for combiner half-lengths between 15 and 80 degrees. This range encompasses all international broadcast bands between 3.9 and 18 mc./s.

FIGURES 14 and 15 show how measured impedance parameters compare with those computed for the combining network that was installed. The curves were computed, and the measured points are shown as circles and crosses. Relatively good correlation between measured and computed values was obtained. The circles are measured points when the combining network is terminated with two non-inductive 230 ohm resistors in the operating configuration. The departure of the measured values from those computed is attributed to the effect of lumped capacitances at the supporting insulators and shorting bars, and slight coupling external to the circuit.

The crosses are measured points when the combining network is terminated in its dissipation-line and a real load. The departure of measured data from computed is attributable to load-impedance excursions from discrete resistive values.

It was expected that the voltage limitations for corona would not be exceeded if the combiner were dimensioned for two 100 kw. transmitters operating carrier power only. But the size of conductor required from impedance considerations was large enough that the highest expected circulating currents could be transported without an appreciable temperature increase, and the highest expected voltages would not give danger of corona.

The network is mounted inside the transmitter building and very close to the transmitters, as shown in FIG. 16. The inside installation was deemed preferable when the problems and cost of remote outside switching and installation were considered. They include problems as: corrosion of moving parts; outside housing; cost of additional length of two transmission lines to the combiner; the extra cost involved to extend the control and instrumentation lines. In addition, because the drive point impedance of the combiner as built does not equal the characteristic impedance of the transmision-lines in use, remote installation could reflect unfavorable load resistances to the transmitters at some frequencies.

The combining network should be as short and compact as possible for inside installation. Due to current limitations, its electrical half-length was selected to be not shorter than 15° at the lowest operating frequency. For 3.9 mc./s., this meant a half-length of 3.2 meters.

At each input to the combiner, a Jennings VMMHC–450 55 kv. vacuum variable capacitor is used to tune out the shunt inductive reactance, as shown in FIGURES 13 and 16. At the upper end of the 9 mc. band, the minimum capacitance of the VMMHC–450 capacitor exceeded that required to tune out the inductive reactance, and the capacitor had to be replaced with a VMMHC–250 whose minimum capacitance is about 15 $\mu\mu$fd. instead of about 25. With this change, it was possible to adjust the combiner to operate to the end of the 15 mc. international broadcast band. The lumped capacitances at the inputs to the combiner added such that if it were desired to operate above the 15 mc. band, the capacitor would have to be replaced by a shunt inductor.

The antenna impedance is transformed through an adjustable lumped network to the proper load resistance at the combiner output. The impedance transformation network design is straightforward. It transforms the antenna impedance, which is delivered on a 600 ohm line, to 200 ohms resistive over all international broadcast bands from 3.9 mc./s. to 18 mc./s. The design allowed for a VSWR on the 600 ohm line of not more than 2.5:1. The voltages and currents within the network fall well within component limitations. One motor-driven VMMHC–250 55 kv. Jennings vacuum variable capacitor was used in shunt with the line, and two differentially driven Johnson series 224 variable 40 amp. inductors were used for the series components.

The other output of the combining network is fed directly to a dissipation-line dimensioned to absorb the full power of both transmitters for the worst-case of a 180° phase reversal. Since normal operation is in-phase, the power capability of the dissipation-line may be reduced considerably if desirable. The dissipation-line may be replaced by another antenna and the combiner would then also serve as a high power phase controlled switch, without the usual contact problems.

The design of the dissipation-line was accomplished by the usual correlation of the thermodynamic aspect of the problem with the electrical power requirements. The dissipation-line was dimensioned for a uniform 200 ohm characteristic impedance with a power dissipation capability of 100 kw. The line was designed to be 200 meters long, starting with a six-wire side connected configuration for the first 100 meters and then transferring to a four-wire side-connected arrangement for the next 50 meters of length. The last 50 meters were constructed in a four-wire cross-connected configuration. The maximum power delivered to the last 50 meter segment was limited to about 4 kw. The wire temperature was not allowed to exceed 450 degrees centigrade at any point along the length of the dissipation-line. A segment of the six-wire side connected 200 ohm copper feed line connects outside the building to the dissipation-line. The junction is used for instrumentation, and the small current sampling loop is used for remote indication of power.

To operate any standard combining circuit, there must be provisions for maintaining the RF inputs in-phase and also for maintaining the modulation in-phase. A common method to adjust the RF phase is to feed both transmitters from a common dual channel exciter. The phase of one of the channels may be controlled by a phase deviation monitor which correlates difference information from sampling loops located at the combiner inputs. This gives automatic correction for phase drift in the transmitters. The audio phase is normally corrected at the inputs to the transmitters and generally remains constant so that automatic correction is not necessary. This discussion is limited to the combining network and associate procedures. It assumes that provisions have been made to assure proper RF and audio phasing of the transmitters.

A series of rigorous performance tests have been conducted of the combiner system using two 50 kw. transmitters modulated 100% for frequencies in all international broadcast bands from 3.96 mc./s. to 18 mc./s. These tests confirmed that the two transmitters were well isolated and that the load impedance did not change with varying input power ratios or relative phase. With one transmitter operating full power, the other transmitter was switched on and off, to various power levels, and the full range of relative phases from 0° to 180°, with no noticeable interaction between transmitters. No corona problems developed and no overheating was discovered in the system. There even appeared to be less interaction between transmitters when combined than when operating independently. In general, these tests were characterized by a singular lack of difficulty. The tests confirmed the ease and simplicity of combining two transmitters using this novel technique.

By taking proper precautions against corona discharge and using conductors dimensioned to handle the circulating current in the diagonal branch supporting the dummy load, the system is adaptable to combine the outputs of transmitters as large as are presently being built.

It will be apparent that changes may be made within the spirit of the invention as defined by the valid scope of the appended claims.

I claim:

1. A combining network comprising conductors one, two, three, and four arranged in parallel relation at the edges of an imaginary square prism, means to insulatingly support said conductors, an electrically conductive connection between first ends of conductors one and two and an electrically conductive connection between first ends of conductors three and four; a first variable reactance electrically connected between said electrically conductive connection between the first ends of conductors one and two and the electrically conductive connection between the first ends of conductors three and four; an electrically conductive connection between the second ends of conductors two and three, and an electrically conductive connection between the second ends of conductors one and four; a second variable reactance electrically connected between the electrically conductive connection between the second ends of conductors two and three and the electrically conductive connection between the second ends of conductors one and four; a first load between the mid portions of conductors one and three and a second load between the mid portions of conductors two and four; a first radio frequency power source electrically connected between the electrically conductive connection between the first ends of conductors one and two and the electrically conductive connection between the first ends of conductors three and four; and a second radio frequency power source electrically connected between the electrically conductive connection between the second ends of conductors two and three and the electrically conductive connection between the second ends of conductors one and four so the entire power of said power sources may be combined and emitted through said first load, and in the event of failure of either power source, the other power source will not be damaged.

2. The invention according to claim 1 in which the reactances are capacitors.

3. The invention according to claim 1 in which the reactances are inductances.

4. The invention according to claim 1 in which each power source is a transmitter and each transmitter is connected to the respective connections by a double-throw double-pole switch adapted to connect its respective transmitter to a separate antenna.

5. The invention according to claim 1 in which one load is an antenna and the other load is a resistor.

6. The invention according to claim 1 in which one load is an antenna and the other load is a dissipation line.

7. The invention according to claim 1 in which one load is an antenna and the other load is another antenna.

References Cited

UNITED STATES PATENTS

| | | | |
|---|---|---|---|
| 2,115,138 | 4/1938 | Darlington | 333—6 |
| 2,602,887 | 7/1952 | Brown | 343—852 X |
| 2,880,396 | 3/1959 | Burgess | 333—11 |

ELI LIEBERMAN, *Primary Examiner.*

PAUL L. GENSLER, *Assistant Examiner.*

U.S. Cl. X.R.

333—8; 343—853, 858